(12) United States Patent  (10) Patent No.: US 9,176,242 B2
Eick et al.  (45) Date of Patent: Nov. 3, 2015

(54) PRACTICAL AUTONOMOUS SEISMIC RECORDER IMPLEMENTATION AND USE

(75) Inventors: Peter M. Eick, Houston, TX (US); Joel D. Brewer, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 892 days.

(21) Appl. No.: 12/607,525

(22) Filed: Oct. 28, 2009

(65) Prior Publication Data

US 2011/0019502 A1  Jan. 27, 2011

Related U.S. Application Data

(60) Provisional application No. 61/112,875, filed on Nov. 10, 2008.

(51) Int. Cl.
*G01V 1/36* (2006.01)
*G01V 1/20* (2006.01)
*G01V 1/24* (2006.01)

(52) U.S. Cl.
CPC .. *G01V 1/20* (2013.01); *G01V 1/24* (2013.01); *G01V 2200/12* (2013.01)

(58) Field of Classification Search
CPC ........ G01V 1/20; G01V 1/24; G01V 2200/12
USPC ..................................................... 367/50, 76
See application file for complete search history.

(56) References Cited

U.S. PATENT DOCUMENTS

| | | | |
|---|---|---|---|
| 3,582,874 A | 6/1971 | Fedoseenko | |
| 3,972,019 A | 7/1976 | Bassett | |
| 4,281,403 A | 7/1981 | Siems et al. | |
| 4,879,696 A | 11/1989 | Kostelnicek et al. | |
| 4,885,724 A | 12/1989 | Read et al. | |
| 6,002,339 A | 12/1999 | Norris | |
| 6,002,640 A | 12/1999 | Harmon | |
| 6,131,694 A | 10/2000 | Robbins et al. | |
| 7,012,853 B2 | 3/2006 | Iseli et al. | |
| 7,295,490 B1 | 11/2007 | Chiu et al. | |
| 7,474,992 B2 * | 1/2009 | Ariyur | 702/190 |
| 7,864,630 B2 | 1/2011 | Chiu et al. | |
| 7,869,304 B2 | 1/2011 | Olson et al. | |
| 8,391,101 B2 | 3/2013 | Brewer et al. | |
| 8,467,267 B2 | 6/2013 | Eick et al. | |
| 8,717,846 B2 | 5/2014 | Eick et al. | |
| 8,869,888 B2 | 10/2014 | Cramer et al. | |
| 2007/0153628 A1 | 7/2007 | Mathiszik et al. | |
| 2008/0049550 A1 * | 2/2008 | Fleure et al. | 367/14 |

(Continued)

FOREIGN PATENT DOCUMENTS

| | | |
|---|---|---|
| WO | WO 0116622 | 3/2001 |
| WO | WO 2005019865 | 3/2005 |
| WO | WO 2007040743 | 4/2007 |

OTHER PUBLICATIONS

PCT/US2009/062375 Notification of Transmittal of the International Search Report and the Written Opinion dated Apr. 15, 2010.

(Continued)

*Primary Examiner* — Daniel L Murphy

(74) *Attorney, Agent, or Firm* — ConocoPhillips Company

(57) ABSTRACT

Seismic systems and methods are provided to synchronize both source and receiver data using inexpensive timers and/or low energy timers to obtain high resolution seismic data.

5 Claims, 4 Drawing Sheets

(56) References Cited

U.S. PATENT DOCUMENTS

| 2008/0137476 | A1 | 6/2008 | Eick et al. |
| 2008/0170469 | A1 | 7/2008 | Phillips |
| 2010/0103772 | A1 | 4/2010 | Eick et al. |
| 2010/0103773 | A1 | 4/2010 | Chiu et al. |
| 2010/0147512 | A1 | 6/2010 | Cramer et al. |
| 2011/0019502 | A1 | 1/2011 | Eick et al. |

OTHER PUBLICATIONS

M. Schmitz, A. Martins, C. Izarra, M.I. Jacome, J. Sanchez and V. Rocabado, "The Major Features of the Crustal Structure in North-Eastern Venezuela from Deep Wide-Angle Seismic Observations and Gravity Modelling", Tectonophysics, Elsevier, Amsterdam, NL, vol. 399, vol. 1-4, Apr. 27, 2005, pp. 109-124.

Anonymous: "Miniture Seismic Recorder", Refraction Technology, Inc. Brochure, Feb. 1998, XP-002562895, pp. 1-2.

\* cited by examiner

A   B   C   D   E   F

A B C D E F

PRACTICAL AUTONOMOUS SEISMIC RECORDER IMPLEMENTATION AND USE

PRIOR RELATED APPLICATIONS

This application is a non-provisional application which claims benefit under 35 USC §119(e) to U.S. Provisional Application Ser. No. 61/112,875 filed Nov. 10, 2008, entitled "PRACTICAL AUTONOMOUS SEISMIC RECORDER IMPLEMENTATION AND USE," which is incorporated herein in its entirety.

FIELD OF THE DISCLOSURE

The present disclosure generally relates to methods and apparatus for generating seismic signals, and particularly to methods of synchronizing at the source, receiver, and central recorder during seismic data acquisition.

BACKGROUND OF THE DISCLOSURE

Seismic surveys image or map the subsurface of the earth by imparting acoustic energy into the ground and recording the reflected energy or "echoes" that return from the rock layers below. The source of the acoustic energy can be generated by explosions, air guns vibrators, and the like. The energy source is positioned on or near the surface of the earth. Each time the energy source is activated it generates a seismic signal that travels into the earth, is partially reflected, and, upon its return, may be detected at many locations on the surface as a function of travel time. The sensors used to detect the returning seismic energy commonly include geophones, accelerometers, and hydrophones. The returning seismic energy is recorded as a continuous signal representing displacement, velocity, acceleration, or other recorded variation as a function of time. Multiple combinations of energy source and sensor can be subsequently combined to create a near continuous image of the subsurface that lies beneath the survey area. One or more sets of seismic signals may be assembled in the final seismic survey.

Technology continues to increase resolution and complexity of seismic systems such as high fidelity vibroseis seismic acquisition including ZENSEIS™. Vibroseis is a method used to propagate energy signals into the earth over an extended period of time as opposed to the near instantaneous energy provided by impulsive sources. The data recorded through vibroseis must be correlated to convert the extended source signal into an impulse. The source signal using this method was originally generated by a servo-controlled hydraulic vibrator or shaker unit mounted on a mobile base unit, but electro-mechanical versions have also been developed. Signals transmitted through the earth are reflected and analyzed to identify changes in signal. The exact distance the vibrations travel before being reflected are unknown and the transmission rates of the vibrations through different features is unknown, thus the time from transmission of the signal to recordation of the seismic signal is the only direct measure of distance. The exact time is additionally required to extract phase data when more than one vibroseis or other vibrational source is operated simultaneously.

Global Positioning Systems (GPS) are currently used by military and civilians to accurately determine location, direction and rate of movement, as well as time. GPS systems have been used by seismic operators to accurately place source and sensors during seismic surveys and to provide an accurate time for a GPS survey as a single source of time. Other methods are then used to synchronize time between a central recorder, source, and receivers. These methods include high-precision microsecond time recorders, accurate radio-pulse transponders and receivers, as well as other methods of high accuracy time synchronization. Radio-pulse synchronization requires radio communication with a large number of source and autonomous sensors, requires a powered receiver at each sensor, and a very accurate clock or GPS timing device to obtain microsecond precision among all of the integrated devices required for seismic surveying.

Bassett, U.S. Pat. No. 3,972,019, describes accurate timing at distant points where each unit produces synchronized time pulses at time intervals which are the same in the different units and methods for synchronizing the units by direct connection with each other.

Siems and Porter, U.S. Pat. No. 4,281,403, describe a decentralized seismic data recording system including a central station and a plurality of remote seismic recording units. A master clock is provided in the central station. A local clock is provided in each remote recording unit. At the beginning of a work period, the local clocks are synchronized with the master clock. Thereafter, a plurality of seismic data recordings is made. At the end of a work period, the time difference due to tuning drift between the master clock and each respective local clock is ascertained and is recorded. The time difference is linearly prorated over the recordings made during the work period, thereby synchronizing the time base of each seismic data recording with the master clock.

Kostelnicek and Montes, U.S. Pat. No. 4,879,696, describe a method for initiating seismic data storage in an Isolated Distributed Recording System, identifying correlation between a "correlation" signal and a refracted seismic signal containing the correlation signal. Triggering the isolated distributed recorder to store incoming seismic data when the correlation signal is identified. Time Synchronization Systems may be employed that include an accurate clock or other similar timing device at the central station, and each isolated distributed recorder would also have an equally accurate timing device or "local" clock in relationship with the timing device at the central station. Usually, the local clocks are synchronized with the clock at the central station prior to the initiation of active seismic exploration activities.

Reed, et al., U.S. Pat. No. 4,885,724, describe a cableless seismic digital recording system which records seismic-trace data generated by any type of seismic source, including high energy impulsive seismic sources and low energy surface seismic sources such as vibrators. A seismometer is connected to a remotely deployed radio-controlled portable recorder which contains circuitry for sampling, digitizing, processing, storing, and recording seismic-trace data. Coded radio signals instruct each recorder to commence an operation or sequence of operations from a predetermined set of programmed instructions stored in program read only memory included in each recorder. Such operations include seismic-trace data acquisition; optional weighting and vertical stacking; normalization; recording; and seismic source initiation (abstract and p. 8, 1.25-33).

Norris, U.S. Pat. No. 6,002,339, synchronizes seismic event data using a programmable subsystem with an independent timer that can be zeroed, time transmitted with a set of instructions, and the timer can be reset when the instructions are complete. The timer is activated in response to the event and is reset following completion of the event.

Harmon, U.S. Pat. No. 6,002,640, describes use of a Series of nearly Identical Seismic Shots (SISS) to generate a system synchronization signal and instruct remote units. The timing and information contained in the SISS can be used to synchronize and communicate with the data acquisition unit(s).

Iseli, et al., U.S. Pat. No. 7,012,853, describes a method of seismic data acquisition, comprising: a) sensing acoustic energy with a plurality of sensors, each sensor providing an output indicative of the sensed energy; b) collecting a plurality of time samples of each sensor output; c) forming one or more data packets with the collected plurality of time samples: d) adding one or more characterizing bits to the data packets, the characterizing bits representing the time of only the first time sample within the data packet; e) storing the data packets in predetermined memory locations in a field unit; and f) transmitting the data packets. A synchronizing signal is included in the data packets.

Longaker, WO0116622, describes a method and apparatus for controlling vibroseis sources in survey operations. A wireless local area network establishing a communications link among vibroseis sources operating in a group may enable the group to operate independent of a remote control unit and may also provide a distributed system solution that mitigates communication difficulties between the sources and the remote control unit.

Current systems require contact, either radio or direct contact, before, during, and after the seismic survey to synchronize various parts of the system and accurately decode the information encoded in the seismic data. The systems described above use a radio pulse, pre- and post-survey synchronization, a high precision microsecond clock, or other method to synchronize the various independent recorders with the source and central recorder. The receivers, high precision time instruments, and coordinated communications described require expensive and energy intensive equipment. This is not always convenient or possible if multiple seismic measurements are required, when one or more sources or receivers are inaccessible, or when the system is dispersed over a large area.

The industry is plagued with system failures, bulky wiring systems, and lost data due to failures in timing and communication. Current systems do not provide an inexpensive and accurate method to synchronize multiple independent systems used for seismic surveys and record sufficient data to obtain a high resolution image of the geological structures. What is required are inexpensive and simple methods to synchronize equipment for seismic surveys.

BRIEF DESCRIPTION OF THE DISCLOSURE

Prior studies have used the HFVS concept combining unique sweep encoding of ZENSEIS™ and timing synchronization to coordinate source and data recorders. There are multiple methods described in previous studies for the extraction of seismic data for a single seismic record without synchronizing the boxes (distributed recorders), and although each must maintain absolute time, they do not describe the use of multiple distributed GPS units or the use field timers as a method of synchronizing time and seismic signals. None currently use or provide a conventional digital timer or clock that achieves the accuracy required to synchronize seismic sources and data recorders automatically to achieve an autonomous data recorder. None currently use multiple GPS systems located at each recorder and source to confirm and synchronize timing across the entire system. By combining the timing accuracy of a GPS with an inexpensive timer or clock, the size of the autonomous data recorder can be dramatically reduced and less energy is required to maintain the system. Because the system has both an accurate near microsecond timing system and inexpensive timer, the system has sufficient accuracy for an HFVS, ZENSEIS™, slipsweep or similar high fidelity seismic survey, yet can overcome gaps in communication and radio signal without compromising the data recorded therein. The use of a "field timer" reduces battery use but allows sufficient accuracy for simultaneous and continuous seismic surveys over extended periods of time with the autonomous seismic recorder.

Methods of synchronizing seismic data from a variety of recorders are described that do not require microsecond accuracy and can be assembled without external timing devices. In one embodiment, a control timer (conventional timer) is used to synchronize all components of the seismic survey with one or more identical conventional timers at one or more of the field components, the control timer is then compared to standard timer with millisecond accuracy. The control time collected from the control timer is corrected to standard time measured by the standard timer. The corrected control time is used to correct time measurements from each of the field components thus correcting the field measurements to millisecond accuracy. The accuracy of the field measurements can be verified by calculating the standard deviation for each time measurement, individual drift of each clock over a fixed period of time, and the average time for all of the conventional clocks compared with the control or standard timer.

A satellite timing system as described herein includes GPS satellite timing systems, cellular timing systems, or combinations thereof that receive microwave signals directly from satellites or transmitted through relays to a satellite receiver. The receiver may contain an antenna, tuned to the frequencies transmitted by the satellites, receiver-processors, and a highly-stable clock. The receivers may optionally include a Wide Area Augmentation System (WAAS), Differential GPS, Inertial Navigation Systems and Assisted GPS to incorporate data, corrections, and information from other nearby systems. This provides multiple overlapping systems to receive and update time information at each GPS location. GPS signals may also be monitored during seismic surveys to ensure accurate signals are received, determine which signals are available during a survey, and retain information required for adjustment of satellite information if required after the survey has been completed or during data analysis.

The satellite time record is at a minimum a date and time stamp that may be correlated with data points from the data receiver. The satellite record may also include position, velocity, altitude, direction, as well as satellite and correction information available as previously described. Although a variety of date/time formats are available, conversion between each is known and standards for reporting and analyzing date/time/GPS data are provided by the National Institute of Standards and Technology (NIST, www.nist.gov), American National Standards Institute (ANSI, www.ansi.org), and the International Organization for Standardization (ISO, www.iso.org). Although these standards are provided, other formats are also available and may be used.

"Field timer" or conventional timer as referred to herein includes mechanical, electromechanical, digital, or even software based timers with reasonable accuracy. In one embodiment the field timer has less than 20 seconds drift per month, preferably less than 10 seconds drift per month, and most preferably less than 5 seconds drift per month. A field timer may be a "clock" that is coordinated with a time standard such as NIST, ANSI, and/or ISO as previously described. Although these standards are provided, other formats are also available and may be used. A timer may also be independent and need only provide a uniform time measure for synchronizing one or more events during a seismic survey. Conventional timers typically have less than millisecond accuracy and on average have greater than 20 seconds of drift per year.

"Control timer" is a conventional timer identical to the "field timer" being used in the seismic survey that is compared directly with a 2 millisecond standard seismic sample rate. "Control time" is calculated by correcting the time measured by the control timer to the standard time with 2 millisecond or greater accuracy. The corrections to control time can be used to monitor drift over a given time and provide a "regional drift" applicable to all conventional timers used in a given survey or over a given period of time. The time required to define "regional drift" is dependent upon the conventional timer used and the amount of drift present and the length of seismic survey.

"Standard time" or a better than 2 millisecond standard of time can be maintained using an oscillator, GPS time record, radio time standard, "Coordinated Universal Time" (UTC), binary coded decimal (BCD) time code or other exact standard of time with less than 20 seconds of drift per year. Standard time may be an uncorrected measure of time or may include corrections, augmented data, and other adjustments. In another embodiment satellite timing at the source, central recorder, and/or autonomous recorders are used to synchronize all components of the seismic survey using one or more satellite timing systems.

"Regional drift" is a correction factor at each recorded time point that is used to correct the field time to standard time. Because each field timer may have independent drift at each time point, correction of regional drift is calculated by: 1) measuring a "control timer" and dividing by "standard time,"2) averaging the field timers and dividing by standard time, and/or 3) comparing recorded field time and recorded data points can also be used to identify and correct field time to standard time.

Statistical analyses including average, standard deviation, mean, median, distribution, significance, probability, and other analyses known to those of skill in the art may be used to assess the accuracy of the "control time," "field timers," and the data processed using these measurements. Accuracy may be measured for all timers or a subset of timers, outliers may be identified and corrected or removed from the analyses. Time analyses and corrections may be one or more repeated measurements analyzed before, during and after survey to further refine the corrections applied to one or more of the timers. Timers that fall outside acceptable variances may be analyzed and corrected individually; grouped, analyzed and corrected collectively; or removed from the survey.

Energy sources or "source" includes ZENSEIS™, vibroseis, seismic vibrators, airguns, plasma shots, dynamite, and other sources known to one of ordinary skill in the art. Seismic vibrators include trucks, tractors, trailers, boats or ships, submarines, subterranean, or other sources that have a base plate that can be brought into contact with the earth or water. A reaction mass is vibrated at varying frequencies against the baseplate to produce vibratory motion (transmitting vibration energy) which travels downward into the earth via the base plate. A survey may be designed that uses multiple energy sources, each being activated simultaneously so that the recording instruments capture a composite signal with contributions from multiple vibrators. The composite signal forms a record that may be either intentionally composite or separable through data inversion. A variety of programs are available to generate differing source patterns controlled in space, time, and frequency.

Receivers include geophones, hydrophones, accelerometers, electrodynamic receivers, and the like. Receivers may receive one or more than one type of data including vibrational data, acceleration data, location, temperature, time, date, and the like. Vibrational data may be measured between about 1 Hz to 2 KHz, including data from 6 to 80 Hz, about 20 to 40 Hz, or simply all data less than 160 Hz, and combinations thereof. Receivers may include a recorder or transmit data to a remote recorder. An autonomous recorder includes receiver/recorder combinations that automatically record data from the receiver including systems that record data at the receiver and those that record data at a remote location. In a preferred embodiment, data is stored in a temporary drive at the autonomous recorder until it is transferred either physically or wirelessly to a central recorder for data analysis.

A central data collection unit or recorder is a station designed to receive and record data from one or more autonomous recorders. In the past, central recorders received all of the cables and often powered the seismic recording system. With the current system, a central recorder can receive signals from thousands of autonomous recorders after the data is recorded or during the data collection phase. The data is then stored on a data storage medium. The data storage medium may be magnetic media like recording tapes or floppy discs, one or more computer hard drives, digital media like a CD or DVD, and the like.

A data collection unit or recorder is a device that can sample and store the measured outputs of geophones, accelerometers, timers, GPS units, and the like. An autonomous recorder is a data collection unit that works independently of other units and is not under control via radio telemetry or similar technologies during the course of a seismic survey.

A method of using the seismic data recording system is described where one or more autonomous data recorders with at least a data receiver and a field timer are deployed; time is monitored simultaneously on a standard timer and a control timer (synchronized to the field timer); seismic energy is transmitted from a seismic energy source that has a transmitter and a field timer; seismic data and field time are recorded on autonomous seismic recorders; and the field time record is corrected for the seismic data using a regional time drift.

In one embodiment, applicants describe a seismic recording system with a seismic energy source, an autonomous data recorder with a field timer, a standard timer, and a control timer, where the control timer and the field timer are identical timers. Regional drift is simply calculated by dividing control time by standard time for each recorded time point.

Alternatively, an autonomous data recorder apparatus is described with a seismic data receiver, a field timer, a transmitter, and a battery, where the field timer has less than 2 millisecond time accuracy and the drift is monitored with a standard timer. The average field time is calculated and divided by standard time to generate a regional drift for each time point.

Finally, data recorders may be set to record both data points and field time points over a given period. In one example, the data recorder records field time every $1000^{th}$ data point. Inversely, the field timer may transmit a time stamp every second. If the data recorder and the field timer are synchronized, each field time point should be synchronized at an exact data/time interval. Thus at 1000 datapoints per second, each field time mark should be exactly 1 second apart. Drift in the field timer or drift in the data record will be easily identified and corrected. The data/field time can be corrected by correcting the field time, correcting the data record, or using inversion as described in U.S. Ser. No. 61/109,279 to separate and synchronize separated source-receiver centerpoint data.

Because the data and field time can be recorded continuously, there is always a consistent and traceable record that allows correction to the last confirmed time point. A confirmed time point may be either a ground roll, transmitted signal, recorded standard time, radio ping, GPS verified time, and/or UTC/BCD verified time.

Seismic energy sources include ZENSEIS™, vibroseis, seismic vibrator, airgun, plasma shot, and/or dynamite. Seismic recording systems include autonomous data recorders with data receivers, i.e. geophone, hydrophone, accelerometer, electrodynamic receiver, and may include GPS satellite receivers. The control timer and field timer can be mechanical timers, electromechanical timers, digital timers, and/or software timers. Although there can be more than one type of control and field timer, they must each have at least one identical timer to monitor changes in drift. The standard timer can be accurately measured using an oscillator, GPS time record, radio time standard, "Coordinated Universal Time" (UTC), and binary coded decimal (BCD) time code.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION OF EMBODIMENTS OF THE INVENTION

Figure 1:
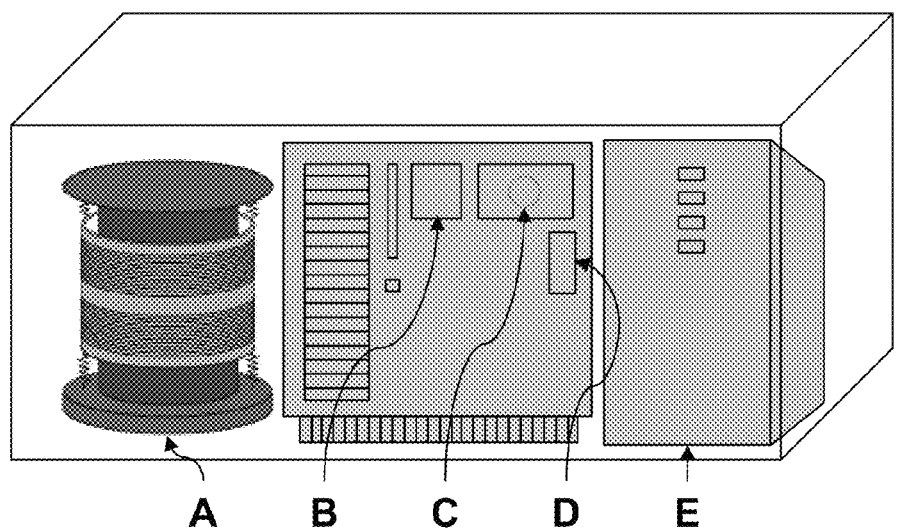
FIG. 1: Autonomous recorder containing a seismic receiver (A), a field timer (B), a processor (C), a data transmitter (D), and a battery (E).

The present invention provides inexpensive, low power, and stable methods of synchronization for seismic sources and receivers. Specifically, accuracy is improved by using a control timer coordinated with a standard time that provides a regional drift to accurately correct and synchronize field timers used with a variety of equipment for autonomous seismic recorders, ZENSEIS™, and other high fidelity vibroseis techniques.

Previously, in U.S. Pat. No. 7,295,490 we have shown that the most effective vibroseis phase encoding scheme may be determined by analyzing the eigenvalues and condition numbers available for a given seismic survey. In US20080137476 methods are described that use the geometric relationship of vibrators and seismic surveys to define locations for sources/receivers from multiple groups of seismic vibrators continuously without interruption. Additionally, U.S. application Ser. No. 11/855,776 demonstrates correcting receiver data using a proximal source to detect and remove noise. U.S. App. Ser. No. 11/933,522 filed Oct. 29, 2008 uses phase encoded vibratory signals to separate multiple sources at one or more receivers. Application 61/109,403 filed Oct. 29, 2008, describes a marine vibroseis system. Copending application 61/109,279 filed Oct. 29, 2008 entitled "Variable Timing ZENSEIS™" describes using source point recorders and adjusting variable seismic recordings to accurately analyze a seismic survey without degrading the seismic signals. Finally, copending application 61/109,329 filed Oct. 29, 2008 details improving the range and resolution of multiple vibratory source seismic system beyond the traditional listening time.

To synchronize seismic systems with a variety of source, receiver, recorder combinations a new and inexpensive system is provided that allows accurate synchronization and decoding of complex seismic data. Provided is a system of simple field timers or clocks that are coordinated and corrected for regional error calculated from a control timer corrected to millisecond accuracy using a standard timer.

The present invention will be better understood with reference to the following non-limiting examples.

Autonomous Recorder Synchronization

A consistent and synchronized timing system is provided by incorporating conventional digital timer (field timer) in each autonomous recorder. Because the digital timer is inexpensive and fairly accurate (less than 10 seconds drift per month) it can be synchronized with a control timer (identical digital timer) that is corrected to millisecond accuracy using an accurate 2 millisecond oscillator as a standard timer. A near millisecond accurate oscillator is normally required for accuracy at each recorder either through direct synchronization at frequent intervals or through communication via radio or other mechanism to synchronize indirectly at frequent intervals.

In one implementation the same continuously recording hardware on the earth's surface and in the source energy initiation unit are used to record both the source output and seismic signals received. With both of these pieces of recording technologies working, the timing of source initiation becomes internalized and irrelevant as it is already captured as part of the source initiation. This allows complete independence from the traditional methods of synchronization of timing and source initiation with conventional seismic. The source initiation time and record length can now be automatically extracted during conventional data processing by merely determining the onset of first energy at the source recorder.

While timing drifts of the recorders are not desirable, it is inevitable that some drift will occur. A second implementation of the invention is to use recognize that sample rate accuracy in timing is all that is needed. This can be achieved by using a reasonably accurate timer in the recorder that independently makes a timing pulse in the recorded data. These timing pulses can then be drift corrected out during data processing by comparing to a standard timing like NIST or GPS clocks.

In one embodiment, timing synchronization is provided by:
1) Distributing a series of data recorders including one or more autonomous recorders with field timers;
2) Synchronizing one or more field timers with a standard timer;
3) Monitoring time on the "standard timer";
4) Providing a seismic energy source (i.e. ZENSEIS™ or other seismic source);
5) Conducting a seismic survey while recording control time, standard time and field time while initiating the seismic energy source using control time;
6) Synchronizing the seismic data collected by correcting the field time using the control time during the data extraction and processing phase.

A simple regional drift may be calculated where regional drift is average "Field Time" divided by "Standard Time" for each time point during the survey. To correct individual field time, the field time is multiplied by the regional drift.

Alternatively, Regional drift may be more accurately assessed by determining the difference or drift at each time point. Plotting the difference between the control time and the standard time over the course of the survey. Using regression analysis to calculate a mathematical description of regional drift. Finally, modifying the field time over the course of the survey using the calculated regional drift.

Additionally, statistical analysis of the time recorded for each field timer may be used to determine the variance between the field timers. The average time recorded for the field timers will ensure the timers analyzed are within standard deviation significantly similar to the control timer over the course of the survey.

GPS Synchronization

A consistent and synchronized timing system is provided by incorporating satellite timing units within each autonomous recorder. This consistent and relatively inexpensive timing system can also be used with satellite accuracy to record time (and optionally position) of each component of the seismic survey. Satellite data may be recorded simultaneously with receiver data to correlate time (and optionally position) of recording with the data recorded. The data emitted from the source is likewise correlated by recording the time (position) and phase of data transmitted from the source. This independent and accurate measure of time allows synchronization of the transmitted and received data for a more accurate and detailed analysis. The system does not require calibration, because the satellite time is updated at intervals and is ubiquitous through the equipment used.

This system is unique because each autonomous recorder need not be GPS synchronized at all times but instead may be synchronized in a punctuated manner either upon instruction from a recorder or vibrator or at intervals during operation. In one embodiment, GPS date and time are accurately recorded on instruction prior to a survey and/or after a seismic survey. In another embodiment GPS date and time are recorded daily at one or more specific times, for example time may be recorded at midnight, 6:00 AM, noon, 6:00 PM, or any other arbitrary time. The number of time recordings may be adjusted dependent upon available memory, availability of GPS signal, number of satellite signals, and accuracy of the signal received. If GPS reliability is "spotty" or a signal is not consistent, the recorder may record the date and time of accurate signals. Thus data within an autonomous recorder may be synchronized at any point while the recorder is operating when a satellite signal becomes available. GPS data may be limited to date and time after the GPS position has been documented. In one embodiment, timing synchronization is provided by conventional GPS units at all recorders and sources to maintain a very high level of timing accuracy. In another embodiment, autonomous recorders are synchronized by interpolation with one or more adjacent timers.

EXAMPLE 1

Simple Autonomous Recorder

Figure 4:
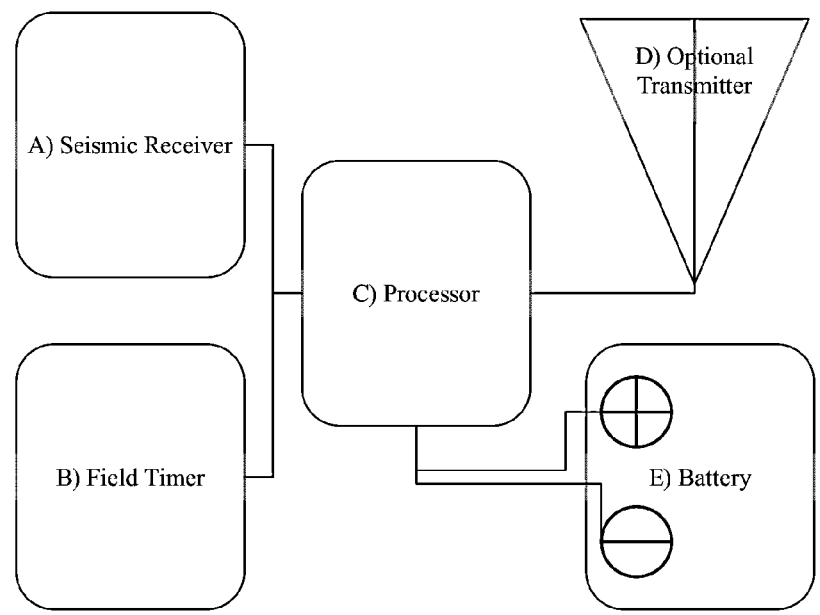
FIG. 4: Diagram of an autonomous recorder containing a seismic receiver (A), a field timer (B), a processor (C), an optional data transmitter (D), and a battery (E).

As shown in FIG. 1, an autonomous recorder is provided that contains a seismic receiver (A), a field timer (B), a processor (C), a data transmitter (D), and a battery (E). The autonomous recorder as diagrammed in FIG. 4 simply transmits a seismic signal and field time record directly to a separate, remote recorder where the seismic data and time are recorded along with data from other recorders. The field timer may be a separate timer or a computer counter incorporated into the processor.

EXAMPLE 2

GPS Synchronized Autonomous Recorder

Figure 2:
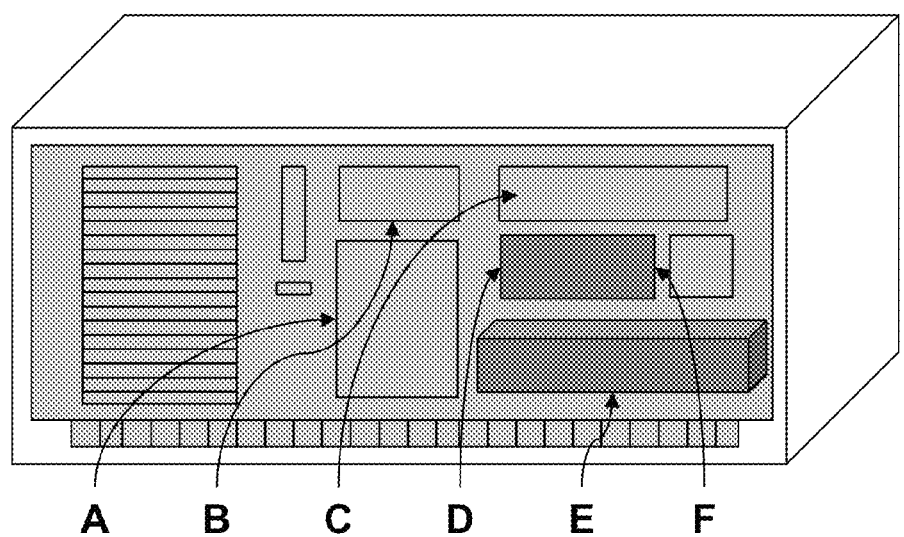
FIG. 2: Autonomous recorder containing a seismic receiver (A), a field timer (B), a processor (C), a data transmitter (D), a battery (E) and a GPS unit (F).

As shown in FIG. 2, an autonomous recorder is provided that contains a seismic receiver (A), a field timer (B), a processor (C), a data transmitter (D), a battery (E) and a GPS unit (F). The autonomous recorder as diagrammed in FIG. 4 transmits a seismic signal and field time record directly to a separate, remote recorder where the seismic data and time are recorded along with data from other recorders. The GPS signal is transmitted upon request, at defined times to the central recorder.

EXAMPLE 3

Buffered Autonomous Recorder

Figure 3:
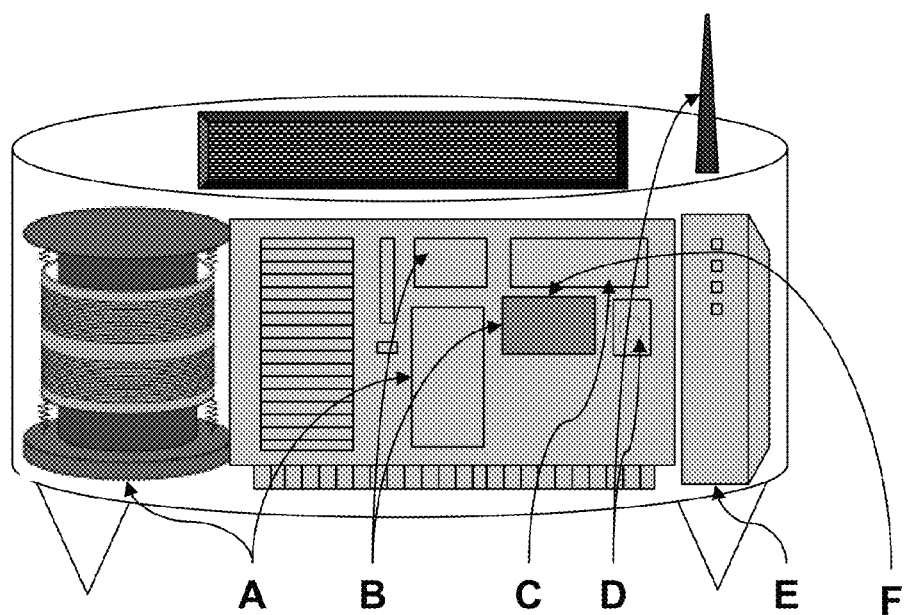
FIG. 3: Autonomous recorder containing a seismic receiver (A), a field timer (B), a processor (C), a data transmitter (D), a battery (E) and a GPS unit (F).

As shown in FIG. 3, an autonomous recorder is provided that contains a seismic receiver (A), a field timer (B), a processor (C), a data transmitter (D), a battery (E) and a GPS unit (F). The autonomous recorder may contain a geophone, accelerometer, directional 3-way accelerometer, one or more solar panels, a GPS processor with built in computer based timer, a memory buffer and transmitter. The autonomous recorder as shown in FIG. 3 stores seismic, timer, and GPS data in a buffer memory. The data is transmitted during and after a seismic survey when the central recorder requests the stored data or at specific time intervals. This system may have multiple redundant components to monitor timing drift, provide a "sleep battery," multiple processors, multiple transmitters, and other systems required for operation of individual components or the system as a whole.

In one embodiment the autonomous recorder has a central processor, a GPS, multidirectional accelerometer, geophone, three timers including a standard field timer, a timing program on the processor, and a timing program on the GPS, a GPS antenna, a RF antenna, a battery pack, a motherboard battery, a flash memory drive, one or more solar panels, a digital thermometer, a voltmeter, and other equipment to monitor seismic activity, weather, position, remaining power, and other vital monitors to record seismic and environmental data.

Although the systems and processes described herein have been described in detail, it should be understood that various changes, substitutions, and alterations can be made without departing from the spirit and scope of the invention as defined by the following claims.

REFERENCES

All of the references cited herein are expressly incorporated by reference. Incorporated references are listed again here for convenience:

1. U.S. Ser. No. 11/855,776 filed Sep. 14, 2007, Olson, et al., "Method and Apparatus for Pre-Inversion Noise Attenuation of Seismic Data."
2. U.S. Ser. No. 11/933,522 filed Nov. 1, 2007, Chiu, et al., "Method and Apparatus for Minimizing Interference Between Seismic Systems."
3. U.S. Ser. No. 12/167,683 filed Jul. 3, 2008, Brewer, et al., "Marine Seismic Acquisition with Controlled Streamer Flaring."
4. U.S. Ser. No. 61/109,279 filed Oct. 29, 2008, Eick, et al., "Variable Timing ZENSEIS™."
5. U.S. Ser. No. 61/109,329 filed Oct. 29, 2008, Chiu, et al., "Simultaneous Multiple Source Extended Inversion."

6. U.S. Ser. No. 61/109,403 filed Oct. 29, 2008, Eick, et al., "Marine Seismic Acquisition."
7. U.S. Ser. No. 61/112,810 filed Nov. 10, 2008, Brewer, et al., "4D Seismic Signal Analysis."
8. U.S. Ser. No. 61/112,875 filed Nov. 10, 2008, Eick and Brewer, "Practical Autonomous Seismic Recorder Implementation and Use."
9. U.S. Ser. No. 61/121,976 filed Dec. 12, 2008, Cramer et al., "Controlled Source Fracture Monitoring."
10. U.S. Pat. No. 3,972,019, Seismograph Service Corp., "Time Synchronization" (Jul. 27, 1976).
11. U.S. Pat. No. 4,281,403, Litton Resources Systems, Inc., "Seismic Data Recording Method and Apparatus" (Jul. 28, 1981).
12. U.S. Pat. No. 4,879,696, Exxon Production Research, "Method and Apparatus for Initiating Seismic Data Storage in an Isolated Distributed Recording System" (Nov. 7, 1989).
13. U.S. Pat. No. 4,885,724, Amoco Corp., "Cableless Seismic Digital Field Recorder Having On-Site Seismic Data Processing Capabilities" (Dec. 5, 1989)
14. U.S. Pat. No. 6,002,339, Western Atlas Int., "Seismic synchronization system" (Dec. 14, 1999).
15. U.S. Pat. No. 6,002,640, Geo X Systems, Inc., "Seismic data acquisition system" (Dec. 14, 1999).
16. U.S. Pat. No. 6,754,590, WesternGeco, L.L.C., "Seismic Surveying Method" (Jun. 22, 2004).
17. U.S. Pat. No. 7,012,853, Input/Output, Inc., "Seismic Data Acquisition Apparatus and Method" ( ).
18. U.S. Pat. No. 7,295,490, ConocoPhillips Co., "High Fidelity Vibratory Seismic (HFVS): Optimal Phase-Encoding Selection" (Nov. 13, 2007).
19. US20080137476, Brewer, et al., "High Fidelity Vibratory Seismic (HFVS): Noise Attenuation before Source Separation for Signal Enhancement" (Feb. 21, 2007).
20. WO199718491, Mobil Oil Corp., "Plural Vibrator Single Step Inversion Separation Method" (May 22, 1997).
21. WO200116622, Trimble Navigation Ltd., "Control of Sources in Survey Operations" (Mar. 8, 2001).
22. WO2005019865, Exxon Mobil Upstream Research Co., "Method for Continuous Sweeping and Separation of Multiple Seismic Vibrators" (Mar. 3, 2005)
23. WO2007040743, ExxonMobil Upstream Res. Co., "Method for Performing Controlled Source Electromagnetic Surveying with Multiple Transmitters" (Apr. 12, 2007).
24. EP0861450, Mobil Oil Corp., "Plural Vibrator Single Step Inversion Separation Method" (Sep. 2, 1998).

We claim:
1. A seismic recording system comprising:
   a) a seismic energy source,
   b) an autonomous data recorder with a field timer that records field time,
   c) a standard timer that records standard time,
   c1) a control timer that records control time,
   d) a processor that corrects the field time from the field timer (b) by using a regional drift, wherein the regional drift is a correction factor calculated using recorded control time and standard time,
   e) calculating a regression-based model of the regional drift; and
   f) modifying the field time using the calculated regional drift.
2. The seismic recording system of claim 1, wherein said seismic energy source (a) is a ZENSEIS™, vibroseis, seismic vibrator, airgun, plasma shot, dynamite or combinations thereof.
3. The seismic recording system of claim 1, wherein said autonomous data recorder (b) comprises one or more data receivers selected from the group consisting of a geophone, hydrophone, accelerometer, electrodynamic receiver, and combinations thereof.
4. The seismic recording system of claim 1, wherein said standard timer (d) and field timer (b) are selected from the group consisting of mechanical timer, electromechanical timer, digital timer, and software timer.
5. The seismic recording system of claim 1, wherein said standard timer (c) is selected from the group consisting of oscillator, GPS time record, radio time standard, "Coordinated Universal Time" (UTC), and binary coded decimal (BCD) time code.

* * * * *